(12) United States Patent
Lamparter et al.

(10) Patent No.: US 11,030,536 B2
(45) Date of Patent: Jun. 8, 2021

(54) METHOD AND APPARATUS FOR OPERATING AN AUTOMATION SYSTEM AND ACCOUNTING FOR CONCEPT DRIFT

(71) Applicant: SIEMENS AKTIENGESELLSCHAFT, Munich (DE)

(72) Inventors: Steffen Lamparter, Feldkirchen (DE); Raffaello Lepratti, Genua (IT); Martin Ringsquandl, Traunstein (DE)

(73) Assignee: SIEMENS AKTIENGESELLSCHAFT

( * ) Notice: Subject to any disclaimer, the term of this patent is extended or adjusted under 35 U.S.C. 154(b) by 883 days.

(21) Appl. No.: 15/565,795

(22) PCT Filed: Mar. 24, 2016

(86) PCT No.: PCT/EP2016/056512
§ 371 (c)(1),
(2) Date: Oct. 11, 2017

(87) PCT Pub. No.: WO2016/165923
PCT Pub. Date: Oct. 20, 2016

(65) Prior Publication Data
US 2018/0121815 A1 May 3, 2018

(30) Foreign Application Priority Data
Apr. 16, 2015 (DE) .................. 10 2015 206 913.3

(51) Int. Cl.
*G06N 5/04* (2006.01)
*G06N 20/00* (2019.01)
(Continued)

(52) U.S. Cl.
CPC ............... *G06N 5/04* (2013.01); *G06N 5/022* (2013.01); *G06N 20/00* (2019.01);
(Continued)

(58) Field of Classification Search
CPC ............ G06N 5/04; G06N 5/02; G06N 5/022; G06N 20/00; G05B 19/418;
(Continued)

(56) References Cited

U.S. PATENT DOCUMENTS

| 2003/0097197 A1 | 5/2003 | Parent et al. |
| 2008/0208774 A1 | 8/2008 | Kim et al. |
| 2015/0364051 A1* | 12/2015 | Razack .................... G09B 7/00 434/322 |

FOREIGN PATENT DOCUMENTS

JP         2004086911 A         3/2004

OTHER PUBLICATIONS

Adams, J., "Unmanned Vehicle Situation Awareness: A Path Forward", HIS Symposium, 2017, pp. 11.*
(Continued)

*Primary Examiner* — Li Wu Chang
(74) *Attorney, Agent, or Firm* — Schmeiser, Olsen & Watts LLP (57) ABSTRACT

A method and an apparatus for operating an automation system is provided. The method for operating an automation system includes the method steps of: providing a learning-based prediction model for the automation system trained by process data including context of an automation process, receiving information about current context of the automation process, verifying context change by comparing the current context to the context of said process data, in the case of any context change verifying a concept drift by comparing pre-drift process data and post-drift process data, in the case of any concept drift re-training said model with post-drift process data, in the case of no context change testing for random concept drift not detected by verifying context change, in the case of any random concept drift extend the
(Continued)

current context by using data comprising previous context changes, otherwise no further method steps are required.

13 Claims, 4 Drawing Sheets

(51) Int. Cl.
  *G06N 5/02* (2006.01)
  *G05B 19/418* (2006.01)
(52) U.S. Cl.
  CPC ............... *G05B 19/41875* (2013.01); *G05B 2219/31368* (2013.01); *G05B 2219/33002* (2013.01); *G05B 2219/34351* (2013.01)
(58) Field of Classification Search
  CPC .... G05B 19/41875; G05B 2219/31368; G05B 2219/33002; G05B 2219/34351; G05B 19/41885; G05B 19/41865; G06Q 10/04; G06Q 10/0631; G06Q 50/04
  See application file for complete search history.

(56) References Cited

OTHER PUBLICATIONS

Gama J et al; "A Survey on Concept Drift Adaptation"; ACM Computing Surveys; vol. 46; No. 4; Article 44; pp. 1-37; ISSN 0360-0300;; 2014.
BPATG; "Beschluß"; betr. Patenanmeldung 101965931-53; pp. 1-10; 2013.
Beschwerdekammern Des Epa; "Visiting Plan"; URL:http://www.epo.org/law-practice/case-law-appeals/pdf/t061392eu1.pdf; T1392/06-3.5.01; pp. Deckblatt 1-2+1-9; 2009.
Dries Anton et al: "Adaptive concept drift detection"; Statistical Analysis and Data Mining; vol. 2 No. 5-6; pp. 311-327; XP055033147; ISSN: 1932-1864; DOI: 10.1002/sam.10054.
Jerome H. Friedman and Lawrence C. Rafsky. Multivariate generalizations of the Wald-Wolfowitz and Smirnov two-sample tests. Annals of Statistics, 7(4):697(717, 1979; 1979.
Day Anind K.: "Understanding and using context". Personal and ubiquitous computing; XP002188155;; 2001.
Ngufor Che et al; "unsupervised labeling of data for supervised learning and its application to medical claims prediction"; Computer Science 14, 2013, 2; http://journals.agh.edu.pl/csci/article/view/277; pp. 191-214; ISSN 2300-7036;; 2013.
http://www.w3.org/RDF/.
Ringsquandl, M., Lamparter, S., and Lepratti, R. (2014). Context-aware Analytics in MOM Applications. In 6th International Workshop on Acquisition, Representation and Reasoning about Context with Logic (EKAW'14).; 2014.
Page, E. (1954). Continuous Inspection Schemes. Biometrika, 41(1), 100-115.; 1954.
K.O. Stanley. Learning Concept Drift with a Committee of Decision Trees. Technical Report AI-03-302, Department of Computer Sciences, University of Texas at Austin, 2003.; 2003.
Zliobaite Indre: "Learning under Concept Drift: an Overview"; arxiv.org; Cornell University Library; Ithaca NY; XP080458352; pp. 1-13.
Arthur Gretton, Karsten M. Borgwardt, Malte Rasch, Bernhard Scholkopf, and Alexander J. Smola. A kernel method for the two-sample-problem. In NIPS, 2006; 2006.
BGH; "Rentabilitätsermittlung"; URL:http://juris.bundesgerichtshof.de/cgi-bin/rechtsprechung/document.py?Gericht=bgh&Art=en&sid=a692aad1001f3e5400c1de465f732b1c&nr=30990&pos=0&anz=1&Blank=1.pdf; pp. 1-12; 2004.
BGH; "Anbieten interaktiver Hilfe"; URL:http://juris.bundesgerichtshof.de/cgi-bin/rechtsprechung/document.py?Gericht=bgh&Art=en&sid=370fe171c4774316b56bc2e18c329076&nr=31043&pos=0&anz=1&Blank=1.pdf; pp. 1-14; 2004.
Fei Du et al: "A Algorithm for Detecting Concept Drift Based on Context in Process Mining"; 2013 Fourth International Conference on Digital Manufacturing & Automation; IEE; pp. 5-8; XP032480792; DOI: 10.1109/ICDMA.2013.2.
International Search Report and Written Opinion for PCT/EP2016/065612.
Japanese Notice of Allowance dated Dec. 24, 2019 for Application No. 2017-554377.
Wikipedia: "Concept drift", Apr. 2, 2015, https://en.wikipedia.org/w/index.php?title=concept_drift&ldid=647075511.
Communication Pursuant to Article 94(3) EPC dated Mar. 25, 2019 for Application No. 16 715 260.2.
Japanese Office Action dated Feb. 5, 2019 for Application No. 2017-554377.
Ringsquandl Martin et al: "Estimating Processing Times within Context-aware Manufacturing systems" IFAC-PapersOnline 48-3 2009-2014 CPEL1752996P pp. 1-6; 2015.

* cited by examiner

METHOD AND APPARATUS FOR OPERATING AN AUTOMATION SYSTEM AND ACCOUNTING FOR CONCEPT DRIFT

CROSS-REFERENCE TO RELATED APPLICATIONS

This application claims priority to PCT Application No. PCT/EP2016/056512, having a filing date of Mar. 24, 2016, based off of German application No. 10 2015 206 913.3, having a filing date of Apr. 16, 2015, the entire contents both of which are hereby incorporated by reference.

FIELD OF TECHNOLOGY

The following relates generally to a method and an apparatus for operating an automation system.

BACKGROUND

Due to high volatility and dynamics in today's markets, manufacturers are required to react more quickly (e.g. frequent changeovers of products) to changing environments, but still ensure efficient production plans and accurate throughput estimates. Since, generally, processing times of machines are not fixed and depend on several variables, such as product type or material quality, accurate estimations of these times need to be available as basis for implementing production plans. Therefore, calculating high-accuracy estimates of processing times of all activities involved in manufacturing is an important task.

With upcoming availability of relevant data in real time through the interconnectedness of all instances related to the value creation process in the recent Industry 4.0 vision, there is a need for manufacturing systems to integrate across manufacturing, business, and product life-cycle processes. Similarly, recently emerging discussions about Manufacturing Operations Management (MOM) also emphasize the requirement of entirely integrated manufacturing, i.e. an extension to Manufacturing Execution Systems (MES) that seamlessly connect to Product Life-cycle Management (PLM) and Enterprise Resource Planning (ERP). With the emergence of new information model standards like "OPC UA", "B2MML" and "AutomationML", MOM systems already are able to provide context information via standardized meta-data descriptions.

In contrast to possible analytical approaches or simulation models, which use fixed or stationary distributed processing times of machines, on-line estimation, for example via statistical learning models, of such times is challenging, because situational dependencies (e.g. changeovers, maintenance events, supplied material quality) can significantly influence machine's processing times. Therefore, the usage of such estimation models should be aware of these dependencies (so-called context) that span across the entire manufacturing process, otherwise production plans and schedules become inefficient. Such a context can be for instance the location of a component, e.g. a sensor component, and its dependencies to other variables of the manufacturing process.

Although it seems straightforward to monitor process variables such as machine's processing times and ask engineers to manually specify the kind of events that need cautious treatment, there are several pitfalls to consider:

Unpredictable Events: Events that influence analytics, but cannot be foreseen even by domain experts, might corrupt decision making. Hence, such events have to be learned bottom-up (from causing situation to decision making)

Dynamic/Flexible Manufacturing: In frequently changing environments (varying orders, changed suppliers, exchanged devices) manual reconfiguration of analytics becomes inefficient.

Recurring Situations: Some situational changes might re-occur over and over, e.g. switching production back and forth between two product variants. Therefore, knowledge about previous event occurrences should be available as soon as such an event happens again.

In all of the previous scenarios, knowledge about context, i.e. interconnected data across the entire manufacturing process, can help to improve analytic applications and ensure applicability of their results.

There are machine learning approaches that deal with the problems of dynamic environments, i.e. adaptive learning, where the underlying data generation processes are prone to so-called concept drifts. Common downsides of most of potential approaches are that they are meant for offline analysis and require pre-defined simulation models or they neglect the presence of concept drifts in the underlying data generation process (e.g. non-stationary distributions of machine's processing times), which depend on the manufacturing system's context.

SUMMARY

An aspect relates to an approach that integrates context information into a flexible production planning and scheduling scenario.

An aspect relates to a dynamic integration of context knowledge and history of MOM systems. A prediction model, also called analytic model is provided from the manufacturer side. In particular the prediction model may be used for fault prediction.

The proposed method for operating an automation system comprises the method steps of:
a) providing a learning-based prediction model for the automation system trained by process data comprising context of an automation process,
b) receiving information about current context of the automation process,
c) verifying context change by comparing the current context to the context of said process data,
d) in the case of any context change verifying a concept drift by comparing pre-drift process data and post-drift process data,
e) in the case of any concept drift re-training said model with post-drift process data,
f) in the case of no context change testing for random concept drift not detected by verifying context change,
g) in the case of any random concept drift extend the current context by using data comprising previous context changes, and
h) otherwise no further method steps are required.

A further aspect of the invention is an apparatus for operating an automation system comprising:
a) Means for obtaining a learning-based prediction model for the automation system trained by process data comprising context of an automation process,
b) Means for receiving information about current context of the automation process,
c) Means for verifying context change by comparing the current context to the context of said process data, d) Means for verifying a concept drift by comparing pre-drift process data and post-drift process data in the case of any context change,
e) Means for providing post-drift process data for re-training said model in the case of any concept drift,
f) Means for testing for random concept drift not detected by verifying context change in the case of no context change, and
g) Means for extending the current context by using data comprising previous context changes in the case of any random concept drift.

A further aspect of the invention is an apparatus for training a learning-based prediction model for an automation system comprising:
a) Means for providing a learning-based prediction model for the automation system trained by process data comprising context of an automation process,
b) Means for receiving post-drift process data for re-training said model in the case of any concept drift which is tested by the above mentioned apparatus.

A further aspect of the invention is a a computer program product (non-transitory computer readable storage medium having instructions, which when executed by a processor, perform actions) directly loadable into the internal memory of a computer, comprising software code portions for performing the steps of the above mentioned method when said computer program (product) is running on a computer.

If such a random concept drift is detected without context change, the current context is extended with adjacent data stored in a context knowledge base.

The context knowledge base can comprise a context knowledge history.

It is possible that the context is represented by features of a piece of product and/or automation process steps and/or in the automation process used apparatus.

The current context can be automatically extended on the basis of the context's influence on the automation process performance.

The model can keep track of a specified subset of a set of context, wherein the initially tracked, specified subset can only contain context instances that are directly associated with process data used for its training.

An embodiment of the invention may be a framework for context-aware analytics within flexible manufacturing systems, motivated by the need for accurate processing time estimates. It can be successfully applied and commits less prediction errors compared to state-of-the-art adaptive learning models. More accurate estimates of processing times directly influence reliability of the manufacturing system's throughput times and cycle times, which are the basis for optimized production planning and scheduling.

Further benefits of this approach are:
Analytic models are automatically tailored to specific situation where they perform optimally and therefore ensure support for optimized decision making.
Knowledge about recurring and similar situations can be used to choose an already available optimal analytic model without the need to specify and train a new one.
Automated integration of context-specific domain expertise in analytic processes which can guide and support data scientists.
The approach results in accurate and reliable analytical models which improves MOM-related Key Performance Indicators.

A further aspect of the invention is combination of concept drift detection and context knowledge. Concept drift detection and context knowledge could be provided from the manufacturer and suppliers side.

Further benefits are:
Efficient detection of changes in data generation processes based on knowledge about business, automation and product lifecycle context without continuously monitoring every data stream item.
Dynamic extension of context for semantic data integration based on feedback of concept drift, which provides tailored context-awareness for analytics.
Analytical models are automatically updated once the underlying physical or IT system changes. This leads to reduced maintenance efforts for MOM systems.

BRIEF DESCRIPTION OF THE DRAWINGS

Some of the embodiments will be described in detail, with references to the following figures, wherein like designations denote like members, wherein.

DETAILED DESCRIPTION

Figure 1:
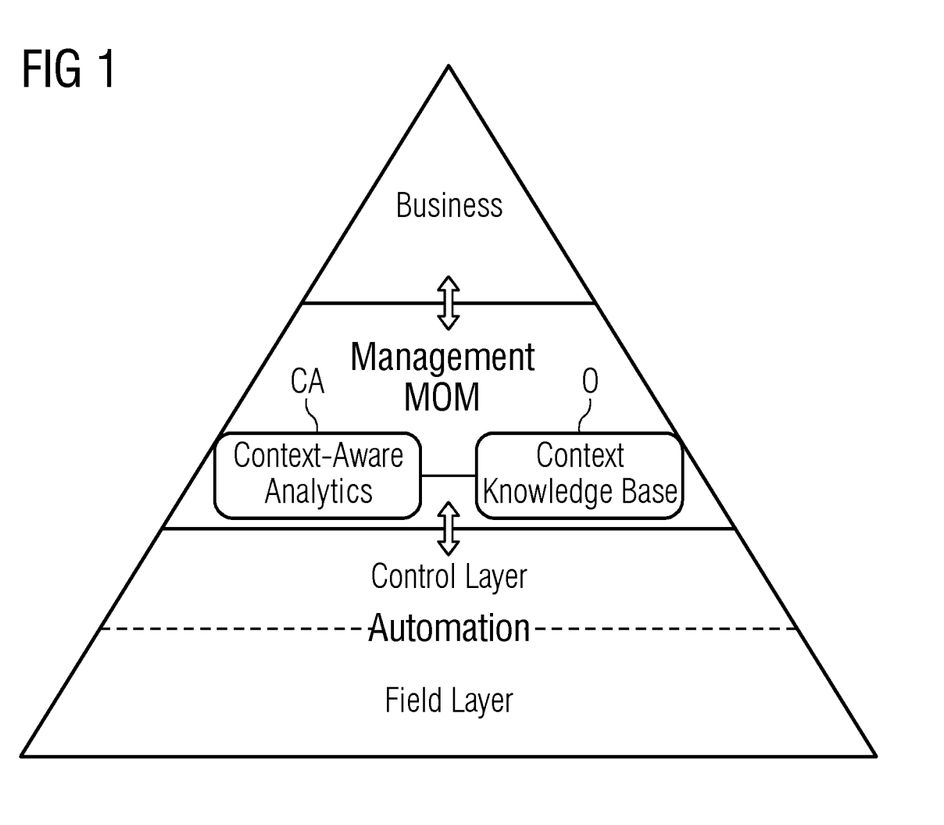
FIG. 1 schematically shows context of MOM systems and analytics in classical automation pyramid.

FIG. 1 schematically shows context of MOM systems and analytics in classical automation pyramid. The automation pyramid consists of various layers/components. The field layer lies under the control layer which is in connection with the MOM management communicating the business layer. There are a context knowledge base O and a context-aware layer among MOM systems that
1) integrates various data sources on a semantic level in a dedicated context knowledge base,
2) keeps track of changes in the context of data generation and
3) ensures context-awareness of analytics to support optimal and situation-sensitive decision making.

Figure 2:
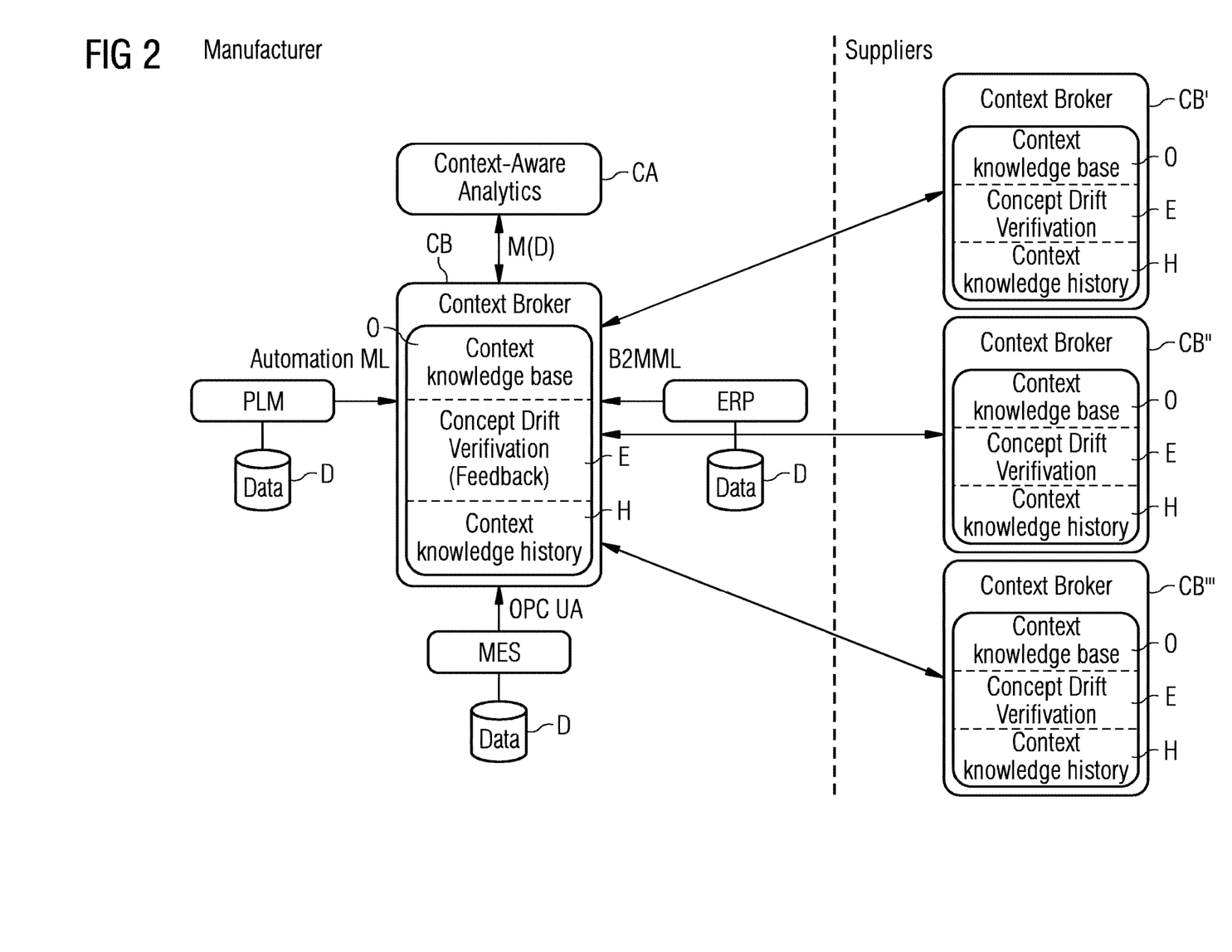
FIG. 2 illustrates a framework of semantic data integration architecture centered around context broker.

FIG. 2 depicts the framework's context broker architecture for semantic data integration and distributions. The shown framework integrates semantic context information into the deployment of analytic models in the manufacturing process. It is assumed that a unified context knowledge base exists and data sources have already been integrated. The architecture consists for instance of the following components:

Context Broker CB: This component consists of a context knowledge base, concept drift verification, and a context knowledge history. It integrates a holistic view of the underlying Manufacturing Operations systems MOM (Product Life-cycle Management PLM and Enterprise Resource Planning ERP) and Manufacturing Execution Systems MES and maps their standardized information models to a general knowledge base. Furthermore, the context broker is responsible for communicating the current context information and historic context to analytic models and possibly to other (suppliers') context brokers e.g. CB', CB'', CB'''. In other words expressed it holds the current global context knowledge base and also propagates context changes (e.g. production switch from one product to another product) to the analytic models.

Context-aware analytics CA: Every analytic model M (e.g. supervised machine learning algorithms) trained on data set is deployed on top of the MOM context broker, which ensures that the model is always kept up-to-date and delivers results in compliance with the current situation.

Context knowledge base: This knowledge base is essentially a global semantic data model O that integrates data from different systems across the manufacturing process (e.g. PLM, MES, ERP). This base represents the current context information model in form of an ontology that integrates several information models (B2MML, OPC UA, AutomationML) via semantic lifting.

Concept drift verification E: This component detects drifting concepts, i.e. abnormalities in the underlying data generation processes. For example, an abruptly increasing error in the processing time estimator. It is then used to verify that a particular context change was the cause of that concept drift. There are several approaches for testing concept drifts in distributions of data sets (e.g. hypothesis tests and classification. Concept drift verification is used to keep track of significant context changes that effectively resulted in a concept drift for a specific analytic model.

Context knowledge history H: Changes in the context knowledge base over time are stored in the context knowledge history so that they can be referred and compared to at later points of time. This is mainly used to see if a recurring or similar situation has already been effectively handled by an analytic model.

Data Sources D: Context information mainly comes from three types of systems: PLM, MES, and ERP. Their data needs to be integrated via standardized information models, like AutomationML, B2MML, and OPC UA. This data is then mapped to the unified global knowledge base.

The general ideas of interconnected instances, data and processes and their value for data analytics are described in the following.

Context-aware analytics in manufacturing may use the context definition of [3], i.e. information that can be used to characterize the situation of an entity.

The entities are those which affect analytic models, more specifically, the data distributions underlying the model's training data. Such context as a global semantic data model is introduced, i.e. a (Description Logic-based) knowledge base comprising terminological and assertional knowledge, denoted as $$O=<T;A>,$$

which integrates data from all systems involved in the manufacturing process.

Figure 4:
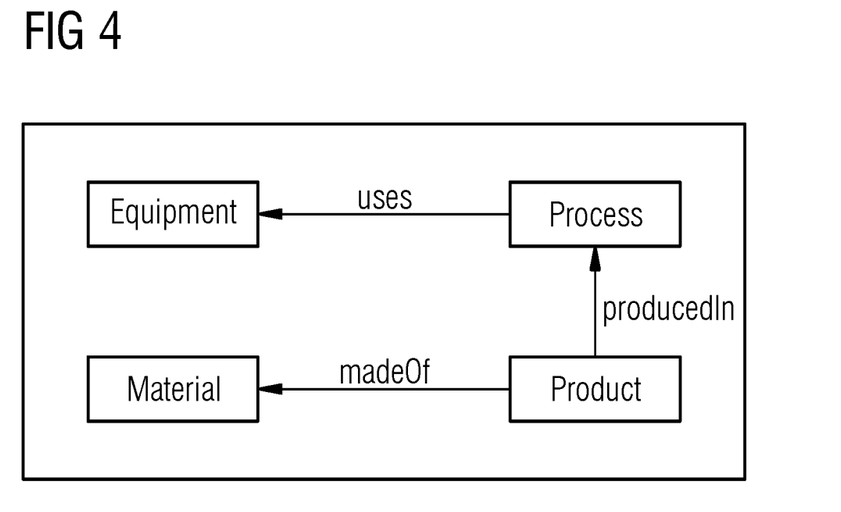
FIG. 4 provides an illustration of concepts and relations in context knowledge base.

Such a Description Logic is shown in FIG. 4 which illustrates concepts and relations in Context Knowledge Base. The context knowledge base integrates data from manufacturing equipment (from OPC UA), product and process data (from AutomationML), plus material and supplier information (from B2MML).

Here, the TBox T defines a common terminology and holds for example knowledge about hierarchy of production devices.

In FIG. 4 concepts and relations in the context knowledge base are shown. A so-called conventionally used Resource Description Framework (RDF [1]) can be used. For instance every individual of type Robot is also of type Equipment.

In a semantic triple form expressed:
<Robot; subclassOf; Equipment>,
where Robot is the subject, subclassOf is a property and Equipment is the object of the triple.

The ABox A specifies assertions about concrete instances of the types defined in T. For example, plant topology information:

<Robo-1; type; Robot>, <Robo-1; usedIn; BodyWelding>.

These three triples relate a concrete individual Robo-1 with a concrete process BodyWelding via the property usedIn.

Figure 5:
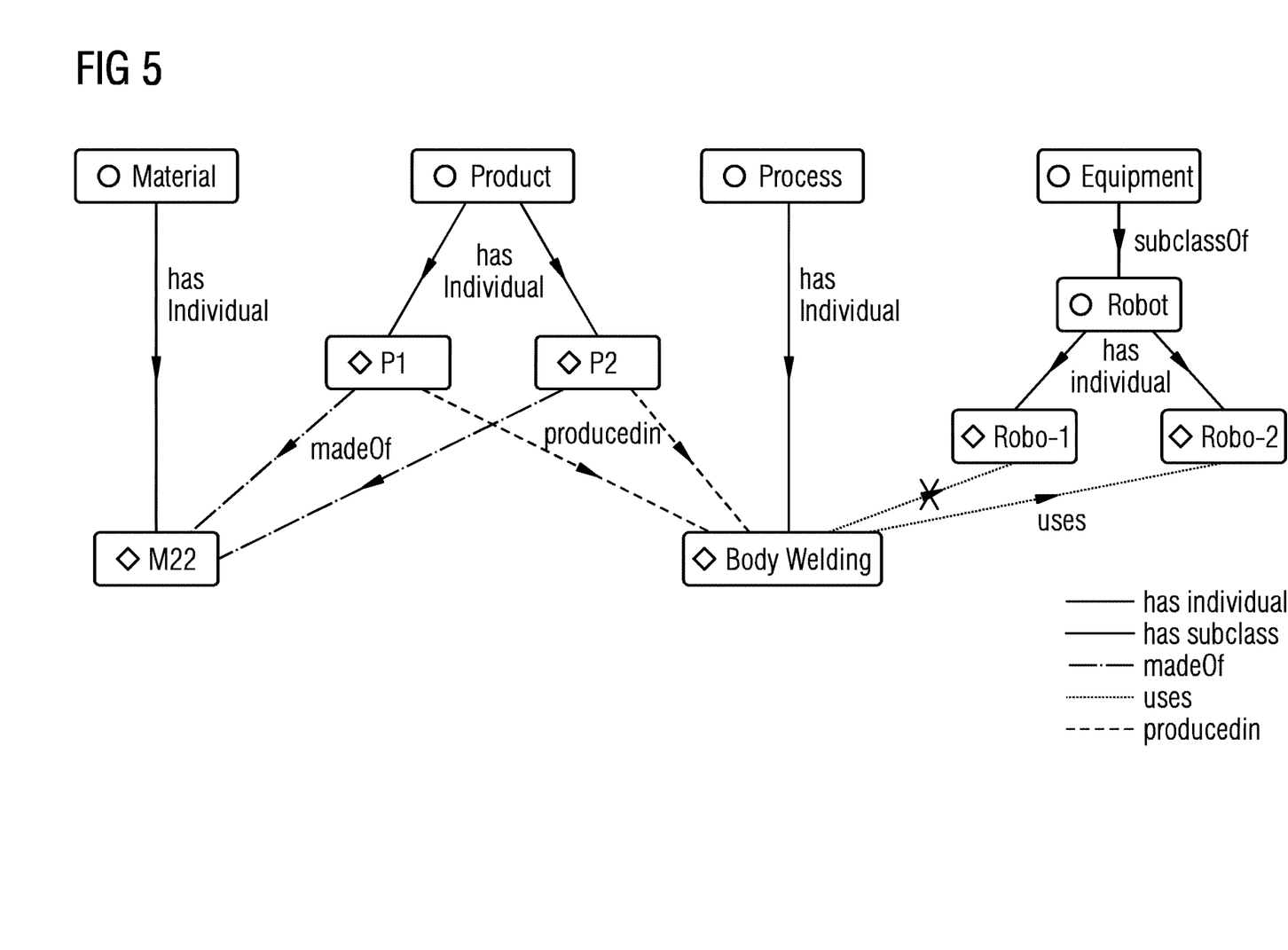
FIG. 5 provides an example of a manufacturing context model.

An exemplary manufacturing context Model is shown in FIG. 5. Context types (classes) are annotated with a circle, concrete individuals with diamonds. The crossed relation usedIn from BodyWelding to Robo-1 indicates a context change, e.g. Robo-1 got replaced by a new Robot Robo-2. Information of such changing equipment can be obtained, for example, via an OPC UA client-server architecture that distributes information model changes.

So far, the notion of context in the manufacturing process has been described. In the following the analytic models in context are explained:

Formally, given set of analytic models $$A=\{M1;M2;\ldots;Mk\}$$

that can be employed for the same task, where each model is assigned a local context, denoted $O_{M1}; O_{M2}; \ldots ; O_{Mk}$, whereby a mapping F from every possible context to analytic model needs to be found.

$$F:2^O \rightarrow A \quad (1)$$

This function is necessary to find the best fitting analytic model for a given situation, for example, if we want to classify a new, unknown input vector x', sampled on underlying global context O. Equations (2) show this situation.

$$F(O)=M^* \quad (2)$$

where M* is the optimal analytic model with respect to some performance criterion, O is the current global context.

Problem setting of context-aware analytic models in MOM are described in in more detail.

To make things more transparent, consider an automated manufacturing process consisting of an MES system that controls several machines in a job shop production environment. Since the machine's processing times are not fixed, the MES uses simple estimates of the machine's average processing times for job shop scheduling and dispatching.

However, due to frequent changeovers, maintenance events, and high variance of materials for different product types, these average estimates are imprecise, which ultimately leads to inefficient and non-optimal scheduling plans.

To overcome this shortcoming, the processing time estimator (analytic model) should become aware of changeovers, maintenance events, etc. (so-called context). For example, the context ABox could specify:

$$A=<MES;controls;Robo-1>,<Robo-1;produces;P1>;\ldots$$

which describes situations when P1 is produced. As soon as the context of the manufacturing process changes, the analytic models need to be adapted accordingly, e.g. different estimators for every situation.

Considering the vast amount of data of systems operating in MOM environments, it would be inefficient to keep track of every changed bit of information. However, it is useful to track changes that are relevant in a particular situation.

Every analytic model M keeps track of a specified subset of the global context. The notion behind this is that, starting from a small initially specified subset of context, the analytic model M should continuously and automatically extend its context based on the context's influence on its performance. At first, the initially tracked context of the model only contains context instances that are directly associated with its input variables.

The initial context of the processing time estimator model M1 for machine number one can be:
{<MES; monitors; Robo-1>}.

After a switch from product P1 to product P2 the error made by M1 increases significantly. Therefore, its context should be extended with the associated previous situation:
{<Robo-1; produces; P1>}.

Furthermore, a new estimator model M1' is introduced for situations in which product P2 is produced. Thus, it is associated with the context
{<Robo-1; produces; P2>}.

Tracking of such evolving context information mainly serves two purposes:
1) detection of recurring situations, where it is known that a particular analytic model performs well,
2) explain unpredictable events that caused drifting concepts and reveal unknown dependencies.

An abrupt concept drift means that, as soon as context changes, it immediately influences estimates of processing times, therefore such changes have to be detected to ensure optimal scheduling solutions.

Figure 3:
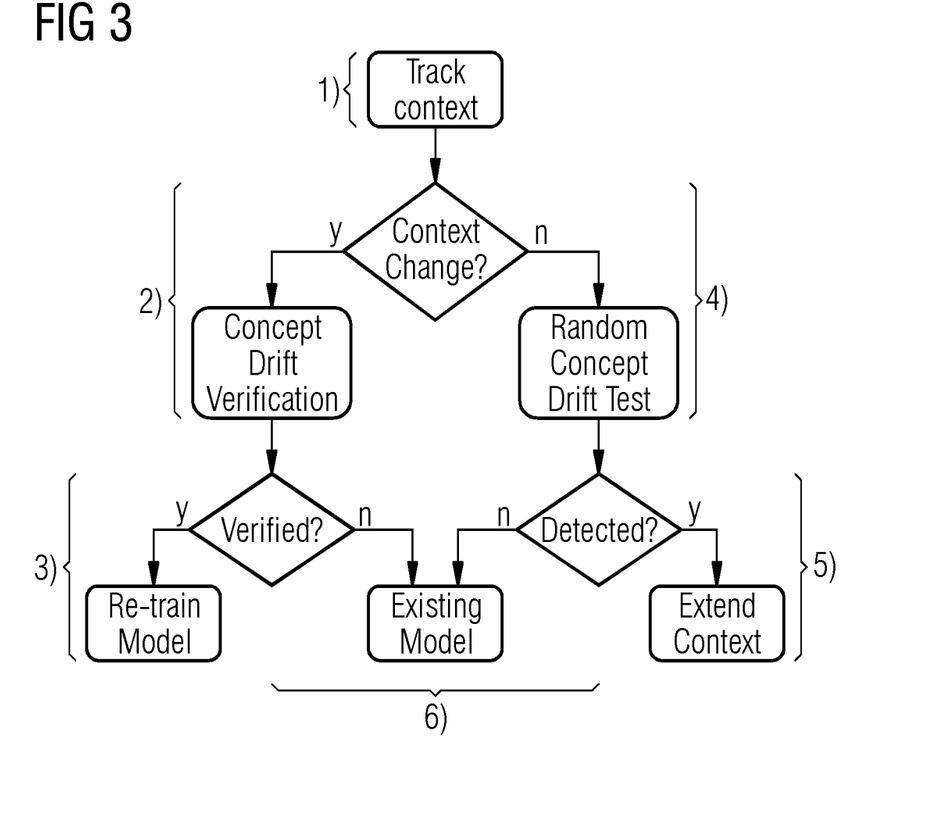
FIG. 3 depicts a decision tree-like procedure of context-aware analytics.

In general, context-aware analytics need to regard situational dependencies, which allow them to use more comparable, homogeneous data with less unexplained noise. To implement this idea, the system architecture enables to define the decision tree-like procedure comprising the following steps 1) to 6) depicted in FIG. 3:
1) In the starting decision node, the context brokers notifies about context changes by comparing the current context to previous context and every model checks if they currently track entities that are affected by the changes.
2) If context change happened, a concept drift verification tests for changes in the data distribution of the model's training data by comparing it to data sampled or bootstrapped after the context change happened. For instance concept drift verification can use Page-Hinkley test. The advantage of this test is that is only required to keep the errors of our models (root mean squared error) in memory, so it does not need large amounts of historic data points to perform the concept drift test.
3) A verified concept drift results in a model adaption, i.e. re-training on post-concept drift data, and tracking of context changes in the history. A new analytic model can be introduced with the respective context change as initial tracking context. Finally, the global context knowledge base also acknowledges the changes.
4) If no context change happened according to knowledge base and history, a test for random concept drift not detected by context changes is employed.
5) A verified concept drift results in a model adaption, i.e. re-training on post-concept drift data, and tracking of context changes in the history. If a concept drift is detected without previous changes (the "random" drift) in context, then the currently tracked context is incomplete. For instance the context can be extended with adjacent context of the global context knowledge base O. The context should be dynamically extended by again using concept drift feedback, i.e. statistical tests to determine if a variable shows abnormal or out-of control behavior. I.e. the model tries to look for context that justifies previously unexplained/"random" concept drifts. In order to extend the initial context of each model, an interval-based "random" concept drift detection is carried out. If such a drift is detected without previous change in the tracked context of model M, it is extended with adjacent triples of the global context knowledge base. An adjacent triple is a triple <s; p; o> in the global context knowledge base, where s or o is tracked in the local context.
6) If concept drift cannot be verified and not be detected, the existing model can still be used.

The above mentioned context change "Robo-1 got replaced by a new Robot Robo-2" is regarded:

A manufacturer of two different product types P1 and P2, which both are made from supplied material aluminum. Also, the same welding robot (Robo-1) is used for the construction (body welding) of both products. The manufacturer wants to predict at arrival whether incoming materials (aluminum work pieces) are going to cause a defective product. In order to train an analytic model which can be a predictive logistic regression model, their quality control sensors measure the dimensions of the incoming material and monitor if a faulty product was the consequence. The training data looks like the following:

TABLE

Training data for fault prediction

| | Product Type | Height (mm) | Length (cm) | Width (cm) | Date | Fault |
|---|---|---|---|---|---|---|
| Training instances X1 before context change | P1 | 2.3 | 80.5 | 51.0 | Jan. 10, 2014 | True |
| | P2 | 2.4 | 80.0 | 50.0 | Jan. 10, 2014 | False |
| | ... | | | | | |
| Training instances X2 after context change | P2 | 2.5 | 80.1 | 50.0 | Jul. 10, 2014 | False |
| | P1 | 2.3 | 80.5 | 51.0 | Jul. 10, 2014 | False |
| | ... | | | | | |

The bold text in the table represents changing context, where welding robot Robo-1 was replaced by the new Robo-2.

Prediction Model:

The prediction is done by a so-called logistic regression model. There is one existing model trained on pre-context change data set X1:

Logistic Regression: $LR(X1)=y$

With X1 consisting of independent variables (Product Type, Height, Length, Width) and y is the dependent variable (Fault).

The context knowledge base is updated with new OPC UA information as engineers replace Robo-1 by Robo-2 at the shop floor. See FIG. 5 where newly introduced "Robo-2" and the shifted relation to the "BodyWelding" process is depicted.

Concept Drift Verification:

Concept Drift verification tests, e.g. described in, for changes in the data distribution of the model's training data by comparing pre-drift and post-drift data set (see above shown table) which represents the context. If the context change actually implies a statistically significant concept drift in the data set distribution, there are two possibilities:
1. If concept drift is verified, the logistic regression model LR is re-trained, i.e. $LR(X2)=y$, with up-to-date data, or
2. else the existing model $LR(X1)=y$ can still be used and there is no need to re-train.

In the first case, since the context change had significant effect, the context knowledge history H keeps track of the changed axioms like follows:
Removed:={Robot(Robo-1), uses(BodyWelding, Robo-1)}
Added:={Robot(Robo-2), uses(BodyWelding, Robo-2)}

If the original context is restored, i.e. due to maintenance the old robot Robo-1 is temporarily used as replacement of Robo-2, then context history detects this recurring situation and analytics automatically switch to predictive model LR(X1).

Although the invention has been described and illustrated in detail by way of the preferred exemplary embodiment, the invention is not restricted by the disclosed examples and other variations can be derived herefrom by a person skilled in the art without departing from the scope of protection of the invention.

For the sake of clarity, it is to be understood that the use of 'a' or 'an' throughout this application does not exclude a plurality, and 'comprising' does not exclude other steps or elements.

The invention claimed is:

1. A method for operating an automation system comprising:
   a) providing a learning-based prediction model for the automation system trained by process data comprising context of an automation process,
   b) receiving information about current context of the automation process,
   c) verifying context change by comparing the current context to the context of said process data,
   d) in the case of any context change verifying a concept drift by comparing pre-drift process data and post-drift process data,
   e) in the case of any concept drift re-training said learning-based prediction model with post-drift process data,
   f) in the case of no context change testing for random concept drift not detected by verifying context change,
   g) in the case of any random concept drift extend the current context by using data comprising previous context changes, wherein the current context is automatically extended on the basis of the context's influence on estimates of processing times, the influence being due to at least one dependency in the automation process,
   h) in the case of no concept drift and no random concept drift, using the provided learning-based prediction model.

2. The method according to claim 1, wherein if such a random concept drift is detected without context change, the current context is extended with at least one adjacent triple stored in a context knowledge base, wherein the at least one adjacent triple is a triple <s; p; o> where s is a subject of the triple, p is a property of the triple, and o is the object of the triple, and wherein s or o is tracked in the current context.

3. The method according to claim 2, wherein the context knowledge base comprises a context knowledge history.

4. The method according to claim 1, wherein context is represented by features of a piece of product and/or automation process steps and/or in the automation process used apparatus.

5. The method according to claim 1, wherein the model keeps track of a specified subset of a set of context.

6. The method according to the preceding claim 5, wherein the initially tracked, specified subset only contains context instances that are directly associated with process data used for its training.

7. The method according to claim 1, wherein the prediction model represents a fault prediction model.

8. An apparatus for operating an automation system comprising:
   a) means for obtaining a learning-based prediction model for the automation system trained by process data comprising context of an automation process,
   b) means for receiving information about current context of the automation process,
   c) means for verifying context change by comparing the current context to the context of said process data,
   d) means for verifying a concept drift by comparing pre-drift process data and post-drift process data in the case of any context change,
   e) means for providing post-drift process data for re-training said model in the case of any concept drift,
   f) means for testing for random concept drift not detected by verifying context change in the case of no context change,
   g) means for extending the current context by using data comprising previous context changes in the case of any random concept drift, wherein the current context is automatically extended on the basis of the context's influence on estimates of processing times, the influence being due to at least one dependency in the automation process,
   h) wherein, in the case of no concept drift and no random concept drift, the provided learning-based prediction model is used.

9. The apparatus according to claim 8, wherein the apparatus comprises a context knowledge base.

10. The apparatus according to claim 9, wherein said context knowledge base comprises a context knowledge history.

11. The apparatus according to claim 8, further comprising:
   a) means for providing a learning-based prediction model for the automation system trained by process data comprising context of an automation process,
   b) means for receiving post-drift process data for re-training said model in the case of any concept drift.

12. The apparatus according to claim 8, where in the prediction model represents a fault prediction model.

13. A computer program product, comprising a computer readable hardware storage device having computer readable program code stored therein, said program code executable by a processor of a computer system to implement a method directly loadable into the internal memory of a computer, comprising software code portions for performing the steps of claim 1 when said computer program product is running on a computer.

* * * * *